United States Patent [19]
Godfrey et al.

[11] Patent Number: 5,736,973
[45] Date of Patent: Apr. 7, 1998

[54] INTEGRATED BACKLIGHT DISPLAY SYSTEM FOR A PERSONAL DIGITAL ASSISTANT

[75] Inventors: Tim Godfrey, Overland Park; David C. Hughes, Jr., Lawrence, both of Kans.

[73] Assignee: Digital Ocean, Inc., Lenexa, Kans.

[21] Appl. No.: 551,476

[22] Filed: Nov. 1, 1995

[51] Int. Cl.⁶ ........................................... G09G 3/28
[52] U.S. Cl. .................. 345/102; 345/183; 178/18; 315/169.3
[58] Field of Search .................. 178/18; 345/76, 345/77, 102, 173, 175, 179, 211, 212, 213; 315/169.3, 209 R, 211, 212, 213, 214; 336/83; 338/210; 364/707; 363/132; 349/61, 69, 96; 361/679, 680, 681, 682, 683, 684

[56] References Cited

U.S. PATENT DOCUMENTS

| | | | |
|---|---|---|---|
| 4,633,141 | 12/1986 | Weber | 345/211 |
| 4,927,986 | 5/1990 | Daly | 178/18 |
| 5,030,943 | 7/1991 | Anglin | 345/102 |
| 5,130,907 | 7/1992 | Tortola et al. | 345/102 |
| 5,191,321 | 3/1993 | Herold et al. | 345/212 |
| 5,345,146 | 9/1994 | Koenck et al. | 315/169.3 |
| 5,353,001 | 10/1994 | Meinel et al. | 336/83 |
| 5,396,443 | 3/1995 | Mese et al. | 364/707 |
| 5,440,208 | 8/1995 | Usakali et al. | 315/169.3 |
| 5,463,283 | 10/1995 | Sanderson | 315/209 R |
| 5,483,262 | 1/1996 | Izutani | 345/179 |
| 5,488,496 | 1/1996 | Pine | 349/96 |
| 5,566,064 | 10/1996 | Schoenwald et al. | 363/132 |
| 5,574,625 | 11/1996 | Ohgami et al. | 361/684 |
| 5,576,601 | 11/1996 | Koenck et al. | 345/77 |
| 5,606,303 | 2/1997 | Suski | 338/210 |

*Primary Examiner*—Steven Saras
*Attorney, Agent, or Firm*—John R. Ley

[57] ABSTRACT

A backlighting system is placed in an elongated interior space within a personal digital assistant (PDA) which normally houses a stylus used to touch a liquid crystal display (LCD) touch and display screen. A backlight driver circuit is constructed on a printed circuit board (PCB) which fits within the elongated space, and an on-off switch extends from the PCB to an exterior hole formed in the PDA housing. An on-time control turns off power to the backlight driver circuit after a predetermined time has elapsed following activation of the on-off switch, and a dimming control controls the amount of energy delivered to the electroluminescent film. A torroidal switching transformer of a high voltage power supply minimizes noise, and a switching controller switches adjustable width current pulses through the transformer to regulate the high voltage level. A flyback circuit captures and uses a portion of the back EMF energy created when the current pulses are switched through the switching transformer. A H bridge of transistors alternately connects the high voltage positively and negatively to energize the electroluminescent film.

20 Claims, 5 Drawing Sheets

INTEGRATED BACKLIGHT DISPLAY SYSTEM FOR A PERSONAL DIGITAL ASSISTANT

This invention relates to small, portable, hand-held computers typically carried by individuals to organize daily tasks and routines and to communicate with others, hereinafter generally referred to as Personal Digital Assistants (PDAs). More particularly, the present invention relates to a new and improved system for backlighting a display of the PDA which consumes a small amount of space within the PDA.

BACKGROUND OF THE INVENTION

An example of a PDA is an Apple Newton. PDAs are powerful, battery operated computers that fit in the palm of a person's hand. The typical PDA contains a microprocessor and enough memory so that it has the functionality of a general purpose computer.

Even though the PDA is similar to a typical portable computer in functionality, a PDA and a portable computer are quite different in form and usage. For example, instead of a typical typewriter-style keyboard of a portable computer, the PDA has a touch sensitive screen by which to enter data and commands. Using the touch screen the user selects icons to launch certain programs or functions. While pressing icons for starting programs may be efficient and practical, the same is not true for entering text data. Pressing alphabetical letters displayed on the touch sensitive screen to form words is somewhat cumbersome and impractical. To solve this problem some PDAs utilize handwriting recognition software. Handwriting recognition software allows the user to write data on the screen thus simplifying data entry.

A pointed pen stylus is used for writing text on the screen. The pen stylus is an elongated object generally in the shape of a pen or pencil. Typically, the pen stylus is stored in an hole or slot located in the housing of the PDA.

Another distinguishing feature of a PDA from a portable computer is that the display screen of a PDA is much smaller than the typical size of the display screen of a portable computer. The typical PDA display screen is a liquid crystal display (LCD). The LCD produces images by reflecting ambient light, not by producing its own light. In general, a LCD uses minimal space because it does not require the equipment to produce its own light. Furthermore, less power is consumed by the LCD. Power consumption is an important consideration with PDA's because they must contain enough battery power to allow a reasonable time of use. Since less power is required to operate the LCD, fewer batteries are needed.

Typically the PDA is preprogrammed for a specific use or vertical application uniquely designed for a specific user. Sometimes the vertical application may be the only use for which the PDA is employed. For example, a telephone company may specifically program a PDA to enable a technician in the field to make and save notes, retrieve information and perform needed calculations, during the repair of equipment. Additionally with the aid of wireless communication technology, the technician may use the PDA to communicate with a larger computer located in their vehicle or to communicate with a larger computer located in some remote location.

The recognized utility of the PDA has resulted in a demand for its use in a variety of different environments including dark and dimly lighted environments. However, the LCD screen cannot be seen in the dark. Because the LCD screen requires ambient light to be reflected to create a image, a dark environment lacks the necessary ambient light necessary to create the reflected images on the LCD screen.

While some form of alternative display screen could be employed in PDA's, many alternative displays consume so much space within the housing of the PDA that the size of the PDA would have to be increased making awkward or inconvenient to handle. Since PDAs are designed to be small and compact, nearly every portion of available space within the PDA housing is already consumed by other equipment.

Another possible solution to this problem might be to attach a light source to the outside of the PDA to create the necessary ambient light. The additional light source would be another additional piece of equipment, and would require its own battery power source. Thus, additional exterior lights are bulky and impractical.

It is with respect to these and other considerations that the present invention has evolved.

BRIEF SUMMARY OF THE INVENTION

In general, the basic aspect of the present invention relates to the incorporation of a display backlighting system in a PDA under circumstances where none was originally incorporated in the PDA because of space and power consumption limitations. Another aspect of the present invention relates to the use of a compact and space efficient display backlight driver circuit which consumes a small amount of electrical power due to its high efficiency. Another aspect of the present invention involves the placement of a display backlight driver circuit within a slot or hole in a PDA which is normally occupied by a stylus used to enter information on the touch screen of the PDA.

In accordance with these aspects, the backlighting system of the present invention comprises backlighting system for use in a PDA of the type having a liquid crystal display (LCD) touch and display screen and providing an elongated interior space within the PDA to contain a stylus normally used for touching the display screen. The backlighting system includes a backlight driver circuit constructed on a printed circuit board (PCB) having a predetermined shape to fit within the elongated space normally occupied by the stylus. An electroluminescent film is associated with the LCD screen and is energized by the backlight driver circuit. In this matter, the backlighting system of the present invention is readily accommodated within the PDA.

Further preferred aspects of the present invention which relate to the incorporation of the backlight driver circuit within the housing of the PDA include an on-off switch connected to the PCB and positioned within an exterior hole formed in the PDA housing for activating the backlight driver circuit, an on-time control activated by the on-off switch for turning off power to the backlight driver circuit after a predetermined time has elapsed following activation of the on-off switch, and a dimming control activated by the on-off switch for controlling the amount of energy delivered to the electroluminescent film.

According to other primary aspects of the present invention, a backlight driver circuit includes a step-up torroidal switching transformer having a primary winding connected to a power source, a switching controller for switching current pulses through the primary winding of the switching transformer, a flyback circuit for capturing and storing a portion of a back EMF energy created when the current pulses are switched through the switching transformer, a high voltage rectifier and a high voltage storage capacitor connected to a secondary winding of the switching transformer to rectify and store a voltage created from the current pulses switched through the primary winding of the switching transformer, and transistor switch sections connected to the high voltage storage capacitor and connected as a H bridge to conducting plates of the electroluminescent film to connect alternately the predetermined high voltage positively and negatively with respect to the conducting plates of the electroluminescent film. The backlight driver system minimizes the amount of electrical power required to energize the backlighting system by capturing and using the back EMF energy that would otherwise be lost from switching current through the transformer. The torroidal switching transformer minimizes the amount of noise generated, and the H bridge driver section effectively develops an AC waveform for energizing the electroluminescent film with a high efficiency and therefore without substantial loss in power.

Further preferred aspects of the backlight driver circuit involve an oscillator comprising a plurality of logic gates connected in series by time delay circuits to supply complementary switching signals to the transistor sections, a feedback circuit responsive to the predetermined higher level of voltage, and a dimming controller connected to the feedback circuit and operative to adjust the level of the control signal to achieve the desired level of backlight illumination for the screen.

A more complete appreciation of the present invention and its scope may be obtained form the accompanying drawings, which are briefly summarized below, from the following detailed descriptions of presently preferred embodiments of the invention and from the appended claims.

DETAILED DESCRIPTION

Figure 1:
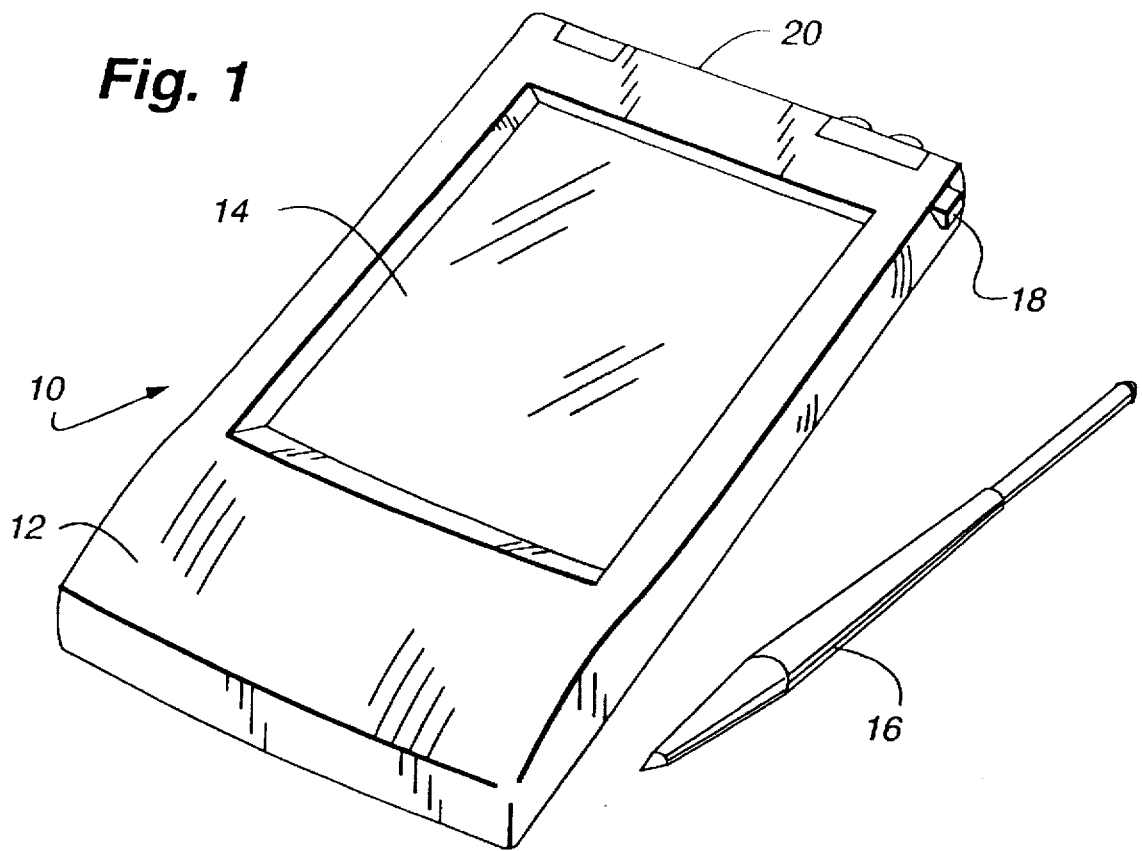
FIG. 1 is a perspective view of a Personal Digital Assistant (PDA) which incorporates a backlight display system of the present invention.

According to the present invention, a display and touch screen backlight system is incorporated into a Personal Digital Assistant (PDA) such as that shown at 10 in FIG. 1. The PDA 10 may be, for example, a "Newton" PDA manufactured by Apple Computer, Inc.. The PDA 10 is a compact personal computer of a size which can conveniently be held in the palm of a users hand. A housing 12 of the PDA 10 confines a processor and memory of the computer and a battery power supply for the computer within its interior.

A typical liquid crystal display (LCD) screen 14 serves as a primary input/output (I/O) device for the PDA. The LCD screen 14 displays information to the user in the conventional manner by reflecting ambient light through patterns of energized liquid crystals to absorb the ambient light and thereby create alphabetical and numeric letters. The LCD screen 14 is also a conventional touch sensitive screen which allows information to be supplied to the computer of the PDA 10. A grid-like pattern of touch sensitive elements derive input signals from pressure placed on the screen 14. The information represented by the location touched on the screen is presented as a display which underlies the display screen. For example, a keyboard my be displayed on the screen 14. Pressure on the screen 14 above one of the letters or numbers displayed results in that letter or number being supplied as an input signal to the computer of the PDA 10.

To facilitate accurate pressure on the touch and display screen 14, a stylus 16 is provided to touch and apply pressure to the screen 14. The stylus 16 is usually stored in an access hole 18 or slot of the housing 12, near an upper end 20 of the housing 12. The user removes the stylus 16 from the hole 18 to touch or write on the screen 14 and stores the stylus 16 in the hole 18 when finished writing.

Because the LCD screen 14 requires ambient light to be reflected in order to create the display, the screen 14 will not display information in dark ambient conditions. Although backlighting systems have been used before with LCD displays, the size limitations within the relatively small housing 12 of the PDA 10 have not permitted adequate space for a backlight driver circuit. Furthermore, because the PDA is powered by an internal battery, its utility is limited by the power delivery time or capacity of the battery. Therefore, every effort has been made to conserve the power from the battery and thereby extend the longevity of use of the computer, and those conservation efforts have resulted in the choice not to include a backlight system for many, if not all, PDA's.

The present invention is directed toward incorporating a screen backlighting system in a PDA, under circumstances where a backlighting system was not originally contemplated. The backlighting system of the present invention provides a highly power-efficient backlight driver circuit of relatively small dimensions which is located within an interior space within the housing 12 where the stylus 16 is normally stored. Although the stylus 16 must be accounted for by the user separately from the PDA housing 12, this effort is relatively insignificant compared to the benefits obtained from achieving a backlighting display screen 12. In addition to the relatively compact size of the backlight driver circuit itself, the elements of the backlight driver circuit have been selected and used to obtain high efficiency and therefore consume a minimal amount of power. As a result, a relatively smaller amount of power from the battery is diverted to the backlighting system.

Figure 2:
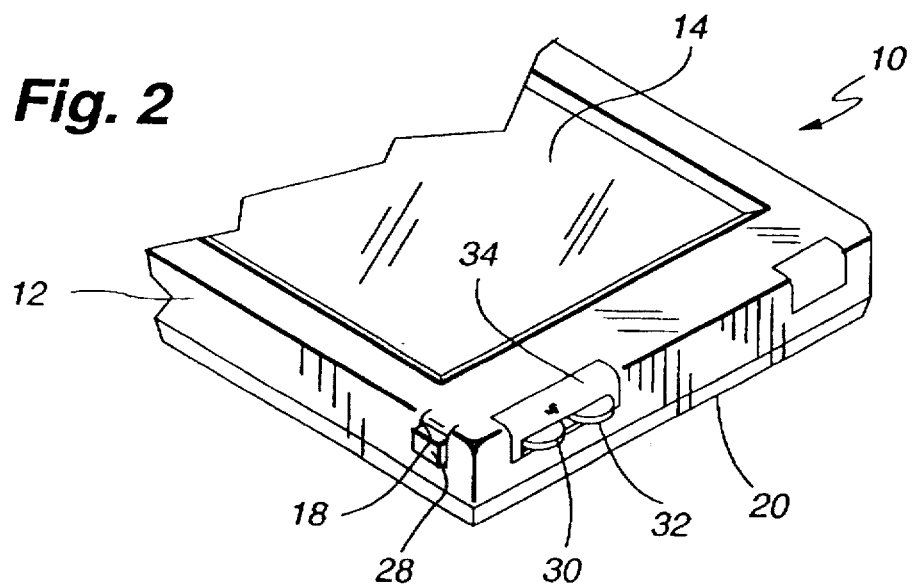
FIG. 2 is a partial view from another perspective of an upper end of the PDA illustrated in FIG. 1.
Figure 3:
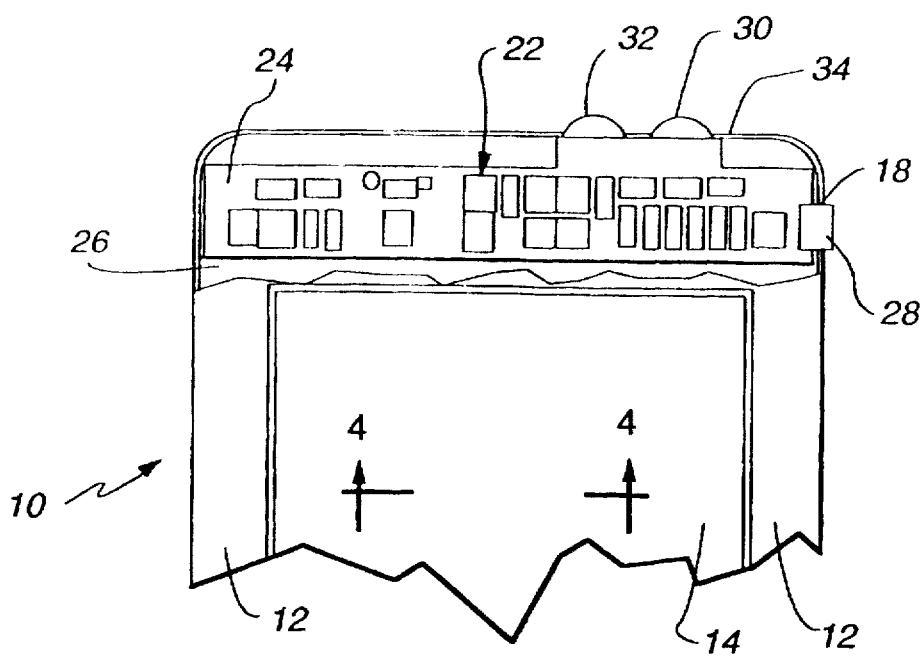
FIG. 3 is a partial top plan view of the PDA shown in FIGS. 1 and 2, with a portion broken away to illustrate the placement of a printed circuit board containing a backlight driver circuit of the backlight display system of the present invention.

The placement of the backlight driver circuit within the PDA housing 12 is generally illustrated in FIGS. 2 and 3. The backlight driver circuit, generally referenced at 22, is constructed on a conventional printed circuit board (PCB) 24. The PCB 24 is relatively long and narrow, and the PCB 24 extends transversely across the upper end 20 of the PDA housing 12 in an interior space 26 within the housing 12 which is normally occupied by the stylus 16 (FIG. 1). The relatively long and narrow shape of the printed circuit board 24 generally complies with the relatively long and narrow space which has been provided within the PDA housing 12 to accommodate the stylus 16. An on-off switch 28 is attached to the PCB 24 and is positioned in the hole 18 when the PCB 24 is located within the PDA housing 12. Consequently, the user may easily activate a backlight driver circuit 22 by depressing the on-off switch 28. A dimming control potentiometer 30 and an on-time control potentiometer 32 are also attached to the PCB 24. The potentiometers 30 and 32 project from an opening 34 in the PDA housing 12 at the upper end 20 of the PDA housing 12. Normally the opening 34 could be used as an infrared communication port.

Figure 4:
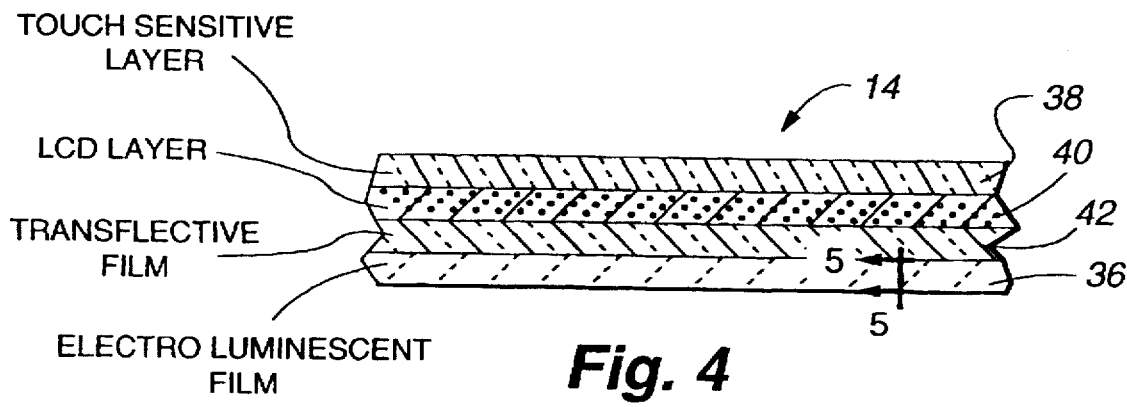
FIG. 4 is an enlarged partial cross sectional view of a touch and display screen of the PDA shown in FIGS. 1 and 2 taken substantially in the plane of line 4—4 in FIG. 3.

In addition to incorporating the backlight driver circuit 22 into the PDA 10, the touch and display screen 14 must also be modified to provide a source of light to substitute for the absence of ambient light. The source of light is a conventional electroluminescent film 36 which is added as a lowermost or last layer of the elements of the screen 14, as shown in FIG. 4. The electroluminescent film 36 is connected to and energized by signals supplied from the backlight driver circuit 22. When energized, the electroluminescent film 36 develops light which substitutes for the absence of ambient light, and allows the LCD touch and display screen to operate in reduced ambient light conditions. The electroluminescent layer 36 functions in conjunction with the other layers of the screen 14.

A top layer 38 of the screen 14 is the touch-sensitive layer of the screen 14 which, when pressed, supplies input commands or signals to the computer of the PDA. The top touch-sensitive layer 38 functions in the conventional manner. Transparent electrodes within the layer 38 form a grid-work. Pressure on the screen causes an electrical connection between two or more of the electrodes, and the resulting signal(s) from the connection is interpreted as the input signal to the computer.

A conventional LCD layer 40 is located beneath the touch sensitive layer 38. The LCD layer 40 comprises groups of segments or pixels (not shown) which are physically oriented to form individual alphabetical or numerical characters. Each pixel consists of a quantity of normally transparent anisotropic liquid sandwiched between two transparent electrodes (not specifically shown). Application of an electric field across the anisotropic liquid causes its light absorptive characteristics to change from transparent to opaque, and the darkened pixel becomes a component of a alphabetical letter or number. Combinations of individual pixels are therefore selectively darkened to form characters and words.

In a non-backlighted LCD screen, a mirror layer (not shown) is located behind the LCD layer 40. The mirror layer reflects ambient light through the non-excited pixels in the LCD layer 40. The light absorptive pixels in the layer 40 supply the necessary contrast between the excited pixels and the surrounding area to create the alphabetical letters and words, and thereby create a display of information.

However in the present invention, the mirror layer (not shown) is replaced by a transflective mirror layer or film 42. The transflective film 42 functions both to reflect ambient light through the LCD layer 40 and to transmit light from the electroluminescent film 36. Thus, when sufficient ambient light exists to create a display from the LCD pixels in the layer 40, the transflective film 42 reflects that ambient light back through the LCD pixels to create a display in a manner similar to a conventional, non-backlighted LCD screen. However, when insufficient ambient light exists, the transflective film 42 allows transmission of light from the electroluminescent film 36 to the LCD pixels in the layer 40, thereby supplying adequate light to establish a legible display of information and allowing the touch screen to be used. The transflective film 42 is conventionally used with backlighted LCD displays.

The transflective film 42 is a thin sheet of material with an upper glossy side that reflects ambient light in a manner similar to a mirror. The transflective film 42 is also partially translucent to allow light from a non-glossy lower side to pass through the film 42. By placing the glossy side of the transflective film 42 toward the LCD layer 40, the LCD layer 40 works in its usual manner during periods of sufficient ambient light. Moreover, when insufficient ambient light exists, the light from a electroluminescent film 36 will enter the non-glossy bottom side of the film 42 and pass through it to the LCD layer 40 also to produce the necessary contrast. The energized LCD pixels block the backlight from reaching the viewer in the same way as the energized pixels block the reflected ambient light.

Figure 5:
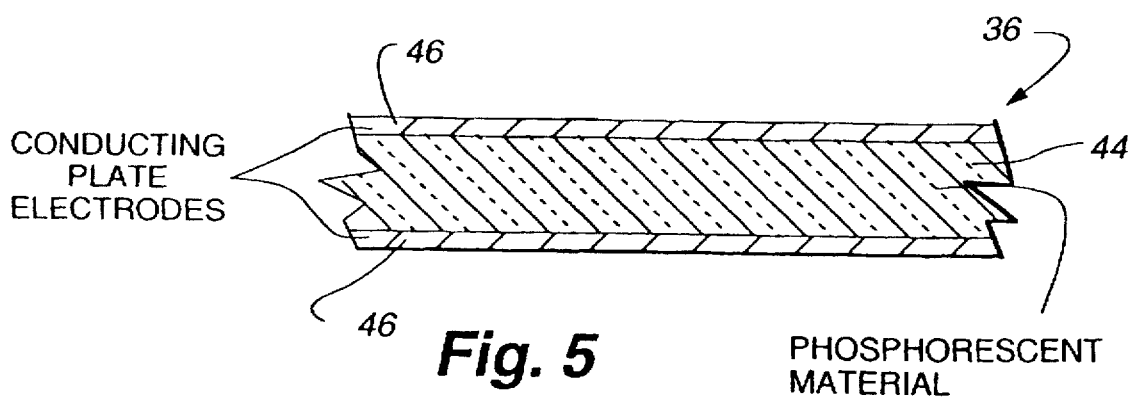
FIG. 5 is an enlarged partial cross sectional view of an electroluminescent film forming a part of the screen shown in FIG. 4, taken substantially in the plane of line 5—5 in FIG. 4.

The electroluminescent film 36 is conventional and has a layer of phosphorescent material 44 sandwiched between two transparent conducting plates 46, as shown in FIG. 5. The conducting plates 46 are connected to the backlight driver circuit 22. The backlight driver circuit 22 supplies an AC voltage waveform across the conducting plates 46, energizing the phosphorescent material 44 and causing it to emit light energy photons. Since the conducting plates 46 are transparent, the photons from the phosphorescent material 44 travel through the plates 46 and then through the transflective film 42, the LCD layer 40 and the touch sensitive layer 38 to the viewer.

Figure 6:
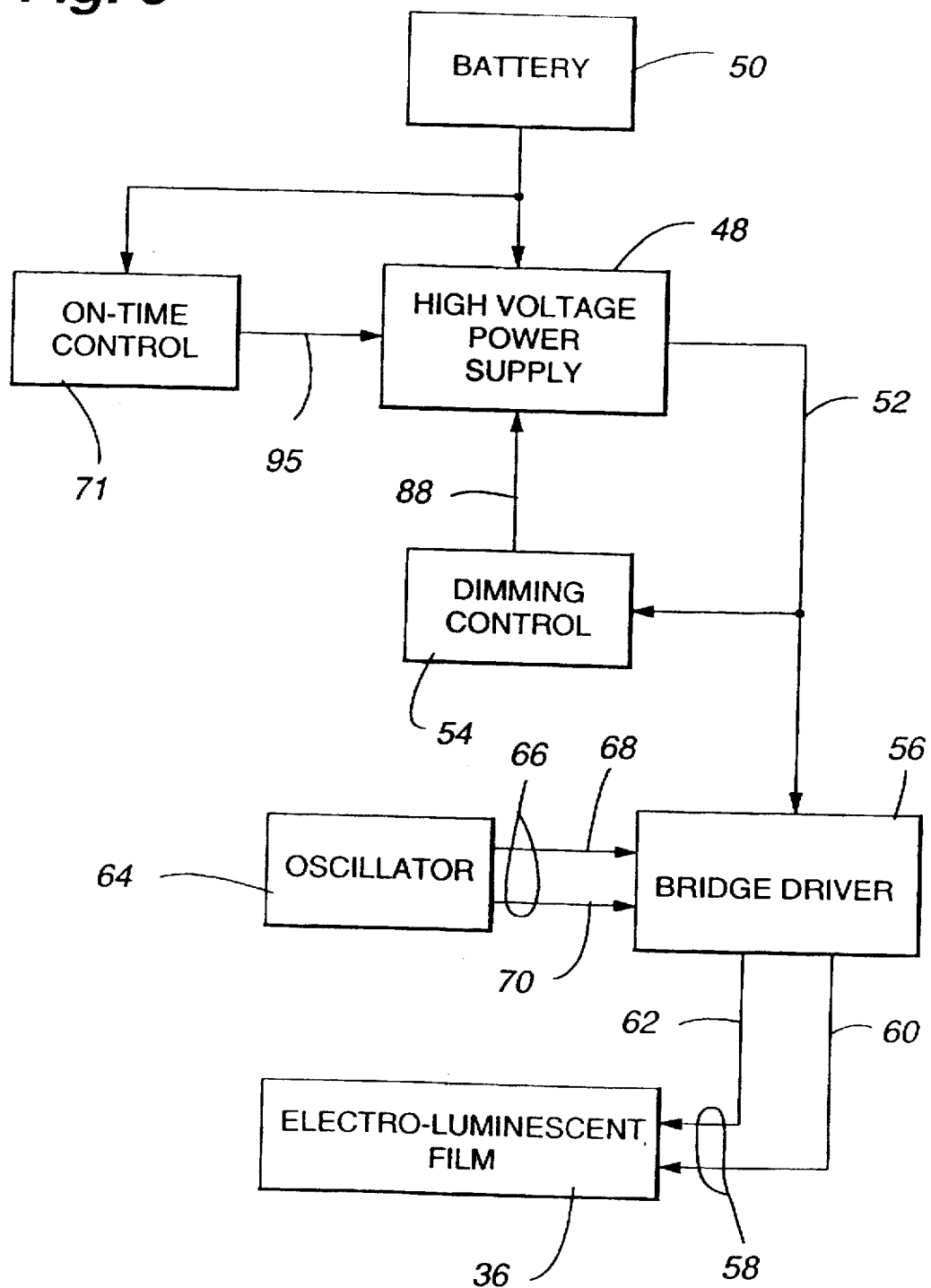
FIG. 6 is a block diagram of a backlight driver circuit of the backlight system used in the PDA shown in FIGS. 1 and 2.

The backlight driver circuit 22, which supplies the AC waveform to the conducting plates 46, is shown in greater detail in FIG. 6. A high voltage power supply 48 raises the voltage from a battery 50, located within the PDA housing 12 (FIG. 1), to a desired high DC voltage level at 52, for example 40–90 DC volts. A dimming control 54, which includes the dimming potentiometer 30 (FIG. 2), controls the level of the DC voltage signal at 52. The high voltage DC signal 52 is applied to a bridge driver 56. The bridge driver 56 converts the high voltage signal 52 to an AC waveform 58 (FIG. 7), and applies the AC waveform 58 on two output lines 60 and 62 to the conducting plates 46 of the electroluminescent film 36 (FIG. 5). An oscillator 64 supplies switching signals 66 on conductors 68 and 70 to the bridge driver 56 to control the frequency of the AC waveform 58 applied to the electroluminescent film 36.

An on-time controller 71 is connected to the battery 50 and to the high voltage power supply 48. The on-time controller 71, which includes the on-time potentiometer 32 (FIG. 2), automatically turns off the backlight driver circuit 22 after a predetermined time has elapsed after it has been energized by the on-off switch 28 (FIG. 2). The length of the time period during which the backlight driver circuit 22 is adjustable by use of the potentiometer 32. The on-time controller 71 is therefore useful in conserving energy from the battery 50, if the user forgets to turn off the backlighting system after it has been used.

Figure 8:
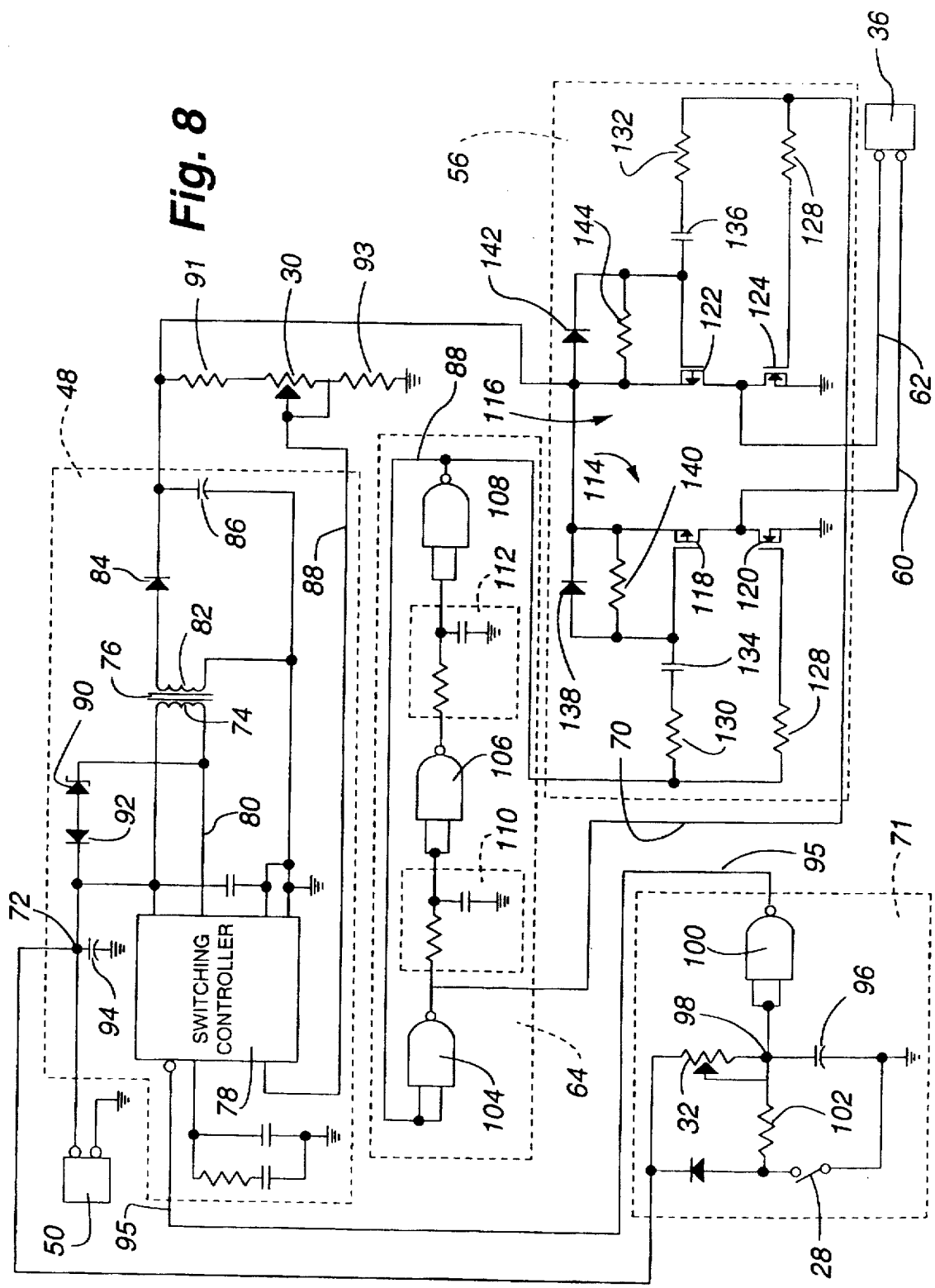
FIG. 8 is a schematic and logic element diagram of the backlight driver circuit shown in FIG. 6.

The details of the backlight driver circuit 22 are understood from the schematic and block diagram shown in FIG. 8. Positive voltage from the battery 50 is applied at a node 72 of the high voltage power supply 48. The node 72 is connected to one end of a primary winding 74 of a transformer 76. The node 72 is also connected to supply power to a conventional switching power supply controller 78. The other end of the primary winding 74 is also connected at a terminal 80 to the switching power supply controller 78. The controller 78 periodically connects the terminal 80 to reference potential, thereby switching current from the node 72 through the primary winding 74 in a square wave. The square wave of current switched through the controller 78 occurs at a predetermined frequency established by the controller 78. Preferably the controller 78 is an integrated circuit having the part designation LT1372.

The square wave of current conducted by the controller 78 through the primary winding 74 of the transformer 76 induces a related current and voltage in a secondary winding 82 of the transformer 76. The transformer 76 is a step-up transformer, causing the voltage from the secondary winding 82 to be increased over the voltage of the battery 50 at the node 72. The stepped up voltage from the secondary winding 82 is rectified by a diode 84 and stored in a capacitor 86. The voltage across the capacitor 86 is the high voltage signal 52 from the high voltage power supply 48.

To be compact yet remain efficient, the preferred form of the transformer 76 is a torroid-shaped, 6.0 µH, 1:12 turn ratio, transformer. The torroid shape of the transformer 76 causes any noise interference produced by the switched current to be relatively self contained within the transformer. Thus, the emitted signals caused by switching current through the transformer 76 do not create interference for the computer and the other components of the PDA.

The switching signal created by the controller 78 on the terminal 80 occurs at a relatively fixed frequency. However, the width or the cycle of each square wave of current conducted by the controller 78 at the terminal 80 is variable. The variability in width or duty cycle varies the amount of energy delivered to the transformer 76, and consequently varies the amount of energy delivered from the transformer 76. Consequently, the level of the high voltage signal 52 is adjustable by adjusting the width of the square waves of current conducted by the controller 78. For example, the voltage level of the high voltage signal 52 is preferably in a range of 40–90 volts, derived from a 9 volt battery 50.

The controller 78 adjusts the duty cycle of the square wave conducted at terminal 80 from a feedback signal 88 derived from the dimming control 54. The dimming control 54 includes a voltage divider formed by resistors 91 and 93 which are connected in series with the dimming potentiometer 30. Adjustment of the wiper arm of the potentiometer 30 causes the level of the feedback signal 88 to vary according to the level of the high voltage signal at 52. The controller 78 responds to the level of the feedback signal 88 and adjusts the duty cycle of the square wave conducted at the terminal 80. Thus, should the voltage of the signal 52 decrease below a desired level, the decreased feedback signal 88 is interpreted by the controller 78 to cause an increase in the duty cycle of the switched square wave of current conducted through the primary winding 74.

Adjustment of the dimming potentiometer 30 also establishes the amount of backlight available. A higher voltage at 52 causes a higher voltage AC waveform 58 (FIG. 7) to be applied to the transparent conducting plates 46 (FIG. 5), thereby causing the phosphorescent material 44 (FIG. 5) of the electroluminescent layer 36 (FIG. 4) to emit more photon energy. Thus, the desired level of backlight needed in particular situations can be adjustable by adjusting the dimming potentiometer 30. When a minimal amount of backlight is required, the adjustment of the dimming potentiometer 30 offers the opportunity to save power from the battery 50.

Power is also conserved because of the high voltage power supply 48 operates on a flyback principle. A Zener diode 90 and a conventional diode 92 are connected back-to-back between the terminal 80 and the node 72. The back EMF generated at the primary winding 74 is conducted through the diode 90 and 92 to charge a capacitor 94. The Zener diode 90 breaks down when the amount of the EMF is greater than the voltage present on the capacitor 94. The diode 92 prevents the voltage at node 72 from discharging through the Zener diode 90 during normal switching operation of the controller 78. Thus, the energy which would normally be lost in the dissipation of the back EMF inherently generated by the switching transformer 76 is captured and employed to minimize the power consumed by the backlight driver circuit 22, thereby prolonging the life of the battery 50.

The controller 78 operates only when an enable signal is applied at 95 from the on-time controller 71 to the switching controller 78. The on-off switch 28 is a part of the on-time controller 71, as is the dimming on-time potentiometer 32. The on-time controller 71 receives power from the battery connected at the node 72.

When it is desired to energize the backlighting system, the normally-open, on-off switch 28 is momentarily closed. Previous to this time, current from the battery 50 has been conducted through the on-time potentiometer 32 to charge a capacitor 96. The voltage level at node 98 across the capacitor 96 establishes an input signal to the input terminals of a NAND gate 100. Ultimately, the voltage at the node 98 has reached the voltage level of the battery 50 as the capacitor 96 charged, because the on-off switch 28 is open and the input impedance at the input terminals of the NAND gate 100 is characteristically extremely high. In response to the high level voltage from node 98, the NAND gate 98 delivers a low level enable signal at 95. The controller 78 is prevented from operating in response to the low level enable signal 95.

When the on-off switch 28 is closed to operate the backlighting system, a resistor 102 from the node 98 is connected through the momentarily closed on-off switch to the potential reference of the battery 50. The connection of the resistor 102 to the reference potential discharges the capacitor 96 and reduces the level of voltage at the node 98. The NAND gate 100 immediately responds by changing the enable signal 95 to a high level. The controller 78 immediately responds to the high level enable signal 95 to commence operation.

When the on-off switch 28 is opened after the force to operate it is released, the voltage across the capacitor 96 does not immediately rise to the level of the battery 50 voltage. Instead, the voltage across the capacitor 96 increases gradually at a rate corresponding to the time constant of the on-time potentiometer 32 and the capacitor 96. At some later time after the on-off switch has been activated and released (established by the setting of the potentiometer 32), the voltage across the capacitor 96 reaches a level where the NAND gate 100 switches states, thereby decreasing the high level enable signal 95 to a low level. The controller 78 immediately ceases operation. By adjusting the resistance value of the potentiometer 32, the amount of time during which the backlight driver circuit 22 remains operative is adjusted.

Figure 7:
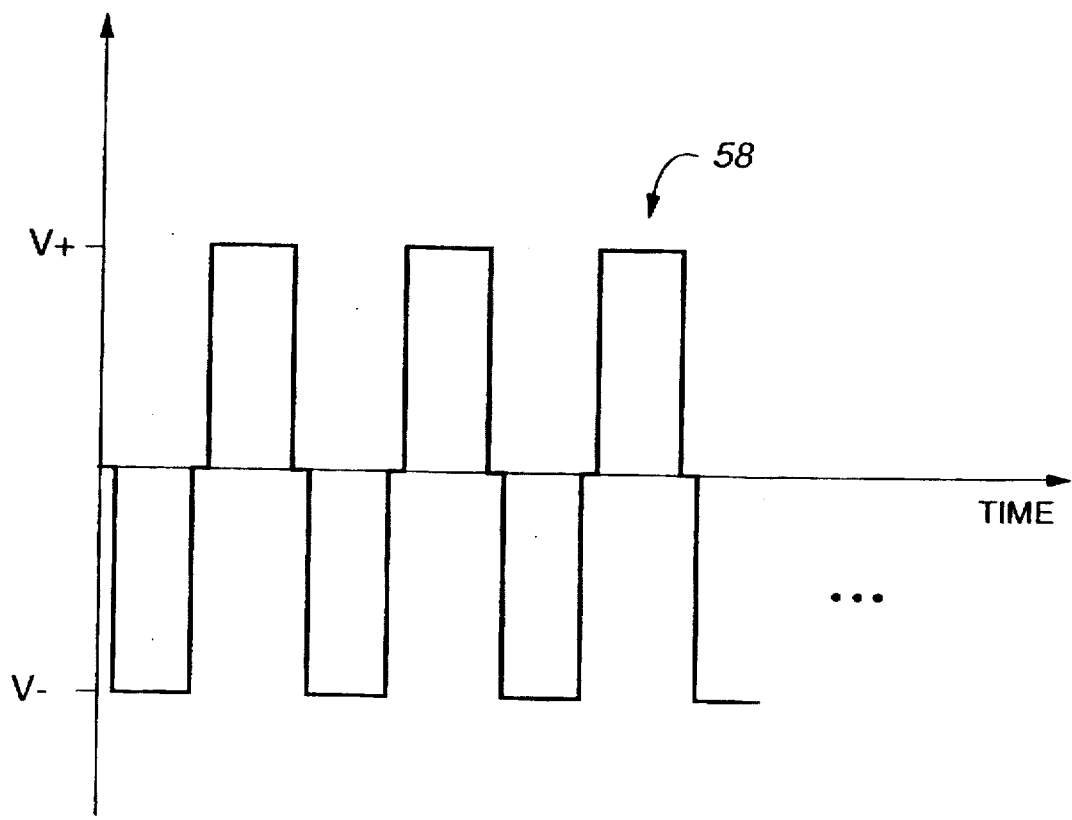
FIG. 7 is a waveform diagram of an exemplary energizing voltage applied by the backlight driver circuit shown in FIG. 6 to the electroluminescent film shown in FIG. 5.

Because it is necessary to drive the phosphorescent material 44 (FIG. 5) with an AC waveform, the high voltage signal 52 from the high voltage power supply 48 is converted into an AC waveform 58, shown in FIG. 7. The magnitude of each half-cycle of the AC waveform 58 is generally the same as the magnitude of the high voltage signal 52. The bridge driver 56 converts the high voltage signal 52 into the AC waveform 58 by switching the voltage level of the signal 52 positively and negatively with respect to the reference potential of the backlight driver circuit 22.

The bridge driver circuit 56 operates in response to switching signals 66 supplied on conductors 68 and 70 from the oscillator 64. The oscillator 64 uses three, two input NAND gates 104, 106 and 108 connected in series. Resistive-capacitive (RC) circuits 110 and 112 connect the output of the NAND gate 104 to the input of the NAND gate 106, and connect the output of the NAND gate 106 to the input of the NAND gate 108. The RC circuits 110 and 112 slightly delay the transmission of the signals between the connected NAND gates. This slight delay causes the three NAND gates 104, 106 and 108 to be unstable and thus oscillate. The frequency of oscillation is established by the time constant of the RC circuits 110 and 112.

To understand the operation of the oscillator 64, first assume an initial state in which the signal level on conductor 68 is at a low logical level. Because the signal level on conductor 68 is at the low logical level, the signal level on conductor 70 is exactly in the opposite state, at a high digital signal level. This occurs because the operation of NAND gate 104 requires this exactly opposite signal level relationship. Immediately after the signal level on conductor 60 changes to the high level, the capacitor in the RC circuit 110 commences charging. The state of the NAND gate 106 does not change until the capacitor of the RC circuit 110 reaches the level to trigger the NAND gate 106. Once the state of the output signal from the NAND gate 106 drops to the low level signal, the capacitor of the RC circuit 112 begins discharging. Since a finite amount of time is required before the capacitor of the RC circuit 112 discharges to the level where the state of the NAND gate 108 changes, a slight delay occurs. Ultimately, the state of the NAND gate 108 changes to a high level digital signal on conductor 68. The high level signal on conductor 68 causes the NAND gate 104 to change states immediately, and the whole sequence of events just described repeats itself, with the exception that the capacitors of the RC circuits 110 and 112 alternatively charge and discharge with each changed level on the conductors 68 and 70.

Figure 9A:
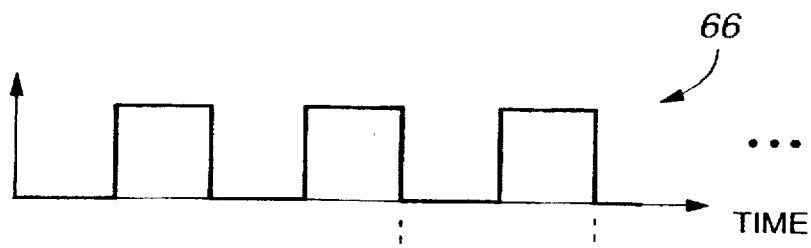
FIGS. 9A and 9B are waveform diagrams of output signals of an oscillator of the backlight driver circuit shown in FIG. 8.
Figure 9B:
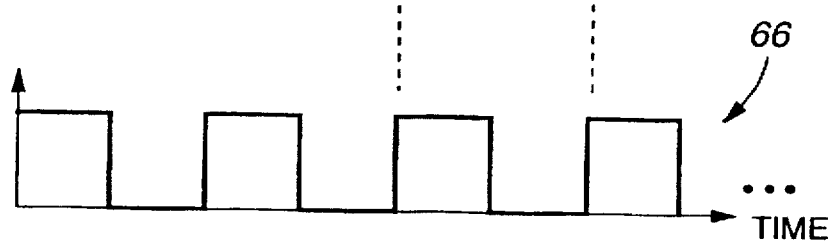

Since the propagation delays caused by the RC circuits 110 and 112 cause the oscillator 64 to operate as an unstable circuit, the voltage levels on the connectors 68 and 70 oscillate at a frequency established by the time constants of the RC circuits 110 and 112. The voltage levels on the conductors 68 and 70 are always at digital levels which are opposite of one another, as is shown in FIGS. 9A and 9B. The switching signals 66 thus form complementary square waves on the conductor 68 and 70 as shown in FIGS. 9A and 9B, respectively. The oscillator 64 operates in this manner continuously, so long as power is supplied to the oscillator during the time that the backlight driver circuit 22 operates. Although not shown, the backlight driver circuit includes a power switch which operates in response to a high level of the enable signal at 95 to supply power to the remaining active components of the circuit 22. The power switch also terminates the supply of power to the active circuit components when the enable signal 95 is low.

The switching signals 66 from the oscillator 64 are applied to the bridge driver 56 to control its operation. The complimentary square wave switching signals 66 on conductors 68 and 70 control two identical field effect transistor (FET) sections 114 and 116 of the bridge driver 56.

The FET section 114 contains a P-channel FET 118 and an N-channel FET 120. The FET section 116 contains a P-channel FET 122 and an N-channel FET 124. The P-channel FET's 118 and 122 have their sources connected to receive the high voltage signal 52. The drains of the P-channel FET's 118 and 122 are connected to the drains of the N-channel FET's 120 and 124. The sources of the N-channel FET's 120 and 124 are connected to the reference potential of a backlight driver circuit 22, while the gates of the N-channel FET's are connected to the conductors 68 and 70, respectively, through resistors 126 and 128, respectively. The gates of the P-channel FET's 118 and 122 are connected to the conductors 68 and 70, respectively, through a series connection of resistors 130, 132 with capacitors 134, 136, respectively. A parallel combination of a diode 138 and a resistor 140 connect the gate and source of the P-channel FET 118, and a parallel combination of a diode 142 and a resistor 144 connect the gate and source of the P-channel FET 122. The parallel resistor-diode combinations 136, 138 and 140, 142 maintain efficiency in switching times.

The lines 60 and 62 are respectively connected between the FET sections 114 and 116 to the transparent conducting plates 46 of the LCD layer 40 (FIG. 5). The line 60 is connected to the junction of the drain of FET 118 and the source of FET 120. Similarly, the line 62 is connected to the junction of the drain of FET 122 and the source of FET 124.

In operation, when the square wave switching signal 66 on the conductor 68 is low, the P-channel FET 118 is off because the voltage at its gate is zero with respect to the voltage at its source. The low level switching signal 66 on conductor 68 has the effect of conductively biasing the N-channel FET 120, thereby causing the line 62 to be connected to reference potential. Thus, in this condition, line 62 is connected to reference potential and the nonconductive P-channel FET 118 blocks the application of the high voltage signal to the conductor 62. However, the opposite condition exists in the FET section 116. The P-channel FET 122 is on because the voltage at its gate is at the high level present on the conductor 70. The high level switching signal 66 on conductor 70 has the effect of biasing the N-channel FET 124 into a nonconductive state, thereby causing the line 60 to be connected to the high voltage signal 52. Thus, in this condition, line 60 is connected to the high voltage signal 52 and the nonconductive N-channel FET 124 isolates the high voltage signal 52 from the reference potential of the backlight driver circuit 22.

In this conductive condition, the FET sections 114 and 116 apply the full level of the high voltage signal at 52 to the line 60 and connect the line 62 to reference potential. During the conductivity time period established by the switching signals 66, the high voltage signal 52 is applied to one transparent conducting plate 46 while the other conducting plate 46 is connected to reference potential.

When the complementary states of the switching signals 66 change, the conductivity conditions of the FET sections 114 and 116 also change. The changed conductivity conditions result from the conductivity of the FET section 114 assuming the conductivity condition of the FET section 116 which existed previously during the immediately previous states of the switching signals appearing on conductors 68 and 70. In this changed state, the full level of the high voltage signal 52 is applied on conductor 62 and the reference potential is applied on conductor 60. This has the effect of creating the AC waveform 58 (FIG. 7) across the transparent conducting plates 46 of the electroluminescent layer 36 (FIGS. 4 and 5), thereby energizing the phosphorescent material 44 and causing it to emit photon energy which constitutes the source of backlight for the touch and display screen 14.

The frequency of the AC waveform 58 should be approximately 1000 Hz for energizing a typical electroluminescent layer 36. This frequency is approximately the optimal frequency at which the phosphorescent material maintains illumination. Consequently, the frequency of the switching square wave signals 66 (FIGS. 9A and 9B) should be approximately 1000 Hz.

The backlight driver circuit 22 is constructed from components that are compactly assembled onto the printed circuit board 24 (FIG. 3) and which are very power efficient in operation. The printed circuit board 24 fits within a limited space originally contemplated for housing the stylus 16, thereby allowing the backlighting system to be incorporated in a PDA when insufficient space exists to otherwise accommodate a backlighting system. The components used to achieve the functionality of the backlight driver circuit are relatively small in physical size and very efficient in their power consumption. The high voltage power supply of the backlight driver circuit captures the back EMF energy which would otherwise be lost, thereby making the voltage step-up operation very power efficient. The bridge driver is also highly efficient in creating the AC waveform which energizes the electroluminescent material. The efficiencies in increasing the level of voltage, and in converting the high voltage signal into the AC waveform for driving the electroluminescent material, contribute significantly to preserving battery power for operating the computer of the PDA. In the preferred embodiment of a backlight driver circuit, the current consumption is very low when the backlighting system is off (about 10 microamps) and is very reasonable when the backlighting system is on (about 100 mA). The minimal power consumption is further enhanced by the timed turn-off feature. Many other improvements and advantages are apparent from a complete appreciation of the aspects of the present invention.

A presently preferred embodiment of the present invention and many of its improvements have been described with a degree of particularity. This description is a preferred example of implementing the invention, and is not necessarily intended to limit the scope of the invention. The scope of the invention is defined by the following claims.

The invention claimed is:

1. A backlighting system for use in a personal digital assistant (PDA) of the type having a liquid crystal display (LCD) touch and display screen and providing an elongated interior space within the PDA to contain a stylus normally used for touching the display screen, comprising:
   a backlight driver circuit constructed on a printed circuit board (PCB) having a predetermined shape to fit within the elongated space normally occupied by the stylus; and
   an electroluminescent film energized by the backlight driver circuit and adapted to be connected to the screen.

2. A backlighting system as defined in claim 1 wherein the PDA includes a housing defining an exterior hole through which the stylus is inserted into the interior space, and wherein the backlight driver circuit further comprises:
   an on-off switch connected to the PCB and positioned within the exterior hole for access in activating the backlight driver circuit.

3. A backlighting system as defined in claim 2 wherein the backlight driver circuit further comprises:
   an on-time control activated by the on-off switch for turning off power to the backlight driver circuit after a predetermined time has elapsed following activation of the on-off switch.

4. A backlighting system as defined in claim 3 wherein the on-time control further comprises:
   an adjustable timing element for adjusting the length of the predetermined time during which the backlight driver circuit is powered on.

5. A backlighting system as defined in claim 4 wherein:
   the adjustable timing element is accessible from the exterior of the housing of the PDA.

6. A backlighting system as defined in claim 2 wherein the backlight driver circuit further comprises:
   a dimming control activated by the on-off switch for controlling the amount of energy delivered to the electroluminescent film.

7. A backlighting system as defined in claim 6 wherein the dimming control further comprises:
   an adjustable dimming element for adjusting the amount of energy delivered to the electroluminescent film.

8. A backlighting system as defined in claim 7 wherein:
   the adjustable dimming element is accessible from the exterior of the housing of the PDA.

9. A backlighting system as defined in claim 1 wherein the touch and display screen includes a LCD layer to which a mirror film is connected for the purpose of reflecting ambient light through the LCD layer, and wherein said backlighting system further comprises:
   a transflective film to replace the reflective film and against which the electroluminescent film is positioned.

10. A backlighting system as defined in claim 1 wherein the PDA includes a housing within which a battery is contained for powering the PDA, and wherein the backlight driver circuit further comprises:
    a high voltage power supply connected to the battery and operative to increase a voltage from the battery to a predetermined higher level, the high voltage power supply including a torroidal transformer.

11. A backlighting system as defined in claim 10 wherein the high voltage power supply further comprises:
    a switching controller for switching current pulses through the transformer; and
    a flyback circuit for capturing and storing a portion of a back EMF energy created when the current pulses are switched through the transformer.

12. A backlighting system as defined in claim 11 wherein the high voltage power supply further comprises:
    a voltage feedback circuit responsive to the predetermined higher level of voltage from the high voltage power supply and operative to supply a control signal related to the level of the predetermined higher voltage; and wherein:
    the switching controller is operative to adjust the width of the current pulses switched through the transformer in response to the control signal.

13. A backlighting system as defined in claim 12 wherein the backlight driver circuit further comprises:
    a dimming controller connected to the feedback circuit and operative to adjust the level of the control signal.

14. A backlighting system as defined in claim 1 wherein the PDA includes a housing within which a battery is contained for powering the PDA, and wherein the backlight driver circuit further comprises:

a high voltage power supply connected to the battery and operative to increase a voltage from the battery to a predetermined higher level; and a bridge driver circuit connected to receive the predetermined higher level of voltage from the high voltage power supply and operative to convert the predetermined higher level of voltage into an AC waveform and to apply the AC waveform to the electroluminescent film.

15. A backlighting system as defined in claim 14 wherein:

the bridge driver circuit further includes a plurality of transistor switch sections which are connected to the high voltage power supply and which, when selectively rendered conductive by switching signals applied thereto, alternately connect the predetermined high voltage positively and negatively with respect to the electroluminescent film.

16. A backlighting system as defined in claim 15 further comprising:

an oscillator connected to the bridge driver and operative to supply complementary switching signals to the transistor sections at a predetermined switching frequency;

the oscillator comprising a plurality of logic gates connected in series by time delay circuits;

the time delay circuits establishing the predetermined switching frequency at a rate which is related to the maintenance of the electroluminescent film in an energized state.

17. A backlight driver circuit for energizing an electroluminescent film having conducting plates to develop backlight for a liquid crystal display (LCD) screen, comprising:

a step-up torroidal switching transformer having a primary winding connected to a power source;

a switching controller for switching current pulses through the primary winding of the switching transformer;

a flyback circuit for capturing and storing a portion of a back EMF energy created when the current pulses are switched through the switching transformer, the flyback circuit including a flyback rectifier and a flyback storage capacitor connected to the primary winding to capture the energy from the back EMF and augment the energy from the power source by the back EMF captured;

a high voltage rectifier and a high voltage storage capacitor connected to a secondary winding of the switching transformer to rectify and store a voltage created from the current pulses switched through the primary winding of the switching transformer, the voltage stored in the high voltage storage capacitor having a predetermined higher level than the voltage of the power source; and four transistor switch sections which connected to the high voltage storage capacitor and connected as a H bridge to the conducting plates of the electroluminescent film, each register switch section responding to switching signals applied thereto to connect alternately the predetermined high voltage positively and negatively with respect to the conducting plates of the electroluminescent film.

18. A backlight driver circuit as defined in claim 17 further comprising:

an oscillator comprising a plurality of logic gates connected in series by time delay circuits, the oscillator supplying complementary switching signals to the transistor sections at a predetermined switching frequency, the predetermined switching frequency establishing a rate which is related to the maintenance of the electroluminescent film in an energized state; and wherein:

one complementary switching signal from the oscillator causes two transistor sections to be conductive and the other complementary switching signal from the oscillator causes the other two transistor sections to be nonconductive, in response to one phase of the complementary switching signals; and the other complementary switching signal from the oscillator causes the other two transistor sections to be conductive and the one complementary switching signal from the oscillator causes the two transistor sections to be nonconductive, in response to the next phase of the complementary switching signals.

19. A backlight driver circuit as defined in claim 17 wherein:

the switching controller is operative to adjust the width of the current pulses switched through the transformer to adjust the predetermined level of the higher voltage.

20. A backlight driver circuit as defined in claim 19 for use in a personal digital assistant (PDA) of the type having an elongated interior space within the PDA to contain a stylus normally used for touching the display screen, wherein:

said backlight driver circuit is located within the elongated spate normally occupied by the stylus.

* * * * *